United States Patent [19]
Brytsche et al.

[11] Patent Number: 5,685,908
[45] Date of Patent: Nov. 11, 1997

[54] APPARATUS FOR SPIN COATING A MULTIFOCAL LENS

[75] Inventors: Horst Hermann Brytsche, Gulfport; Emanuel Dean Farley, Largo; Sidney Shaw White, Jr., Seminole, all of Fla.

[73] Assignee: Essilor Of America, Inc., St. Petersburg, Fla.

[21] Appl. No.: 488,656

[22] Filed: Jun. 8, 1995

[51] Int. Cl.$^6$ .................................................. B05C 5/00
[52] U.S. Cl. ........................... 118/52; 118/58; 118/64; 118/319; 118/320; 425/808
[58] Field of Search ........................... 118/52, 56, 58, 118/63, 64, 65, 319, 320, 326; 427/240, 168; 425/808; 264/1.7, 1.8, 2.1

[56] References Cited

U.S. PATENT DOCUMENTS

| | | | |
|---|---|---|---|
| 4,085,919 | 4/1978 | Sullivan | 425/808 |
| 4,124,411 | 11/1978 | Meuleman et al. | 427/240 |
| 4,510,176 | 4/1985 | Cuthbert et al. | 427/240 |
| 4,822,639 | 4/1989 | Fujii et al. | 118/52 |
| 5,246,499 | 9/1993 | Peralta et al. | 425/808 |
| 5,288,221 | 2/1994 | Stoerr et al. | 425/808 |
| 5,358,740 | 10/1994 | Bornside et al. | 427/240 |
| 5,417,763 | 5/1995 | Diepens | 118/320 |
| 5,514,214 | 5/1996 | Joel et al. | 118/52 |
| 5,529,626 | 6/1996 | Stewart | 118/319 |

OTHER PUBLICATIONS

IBM Technical Disclosure Bulletin, vol. 14, No. 10, Mar. 1972.

*Primary Examiner*—Laura Edwards
*Attorney, Agent, or Firm*—Quarles & Brady

[57] ABSTRACT

An apparatus for coating a multifocal lens, lens blank, or lens mold is disclosed. The lens, lens blank, or mold is spun about an axis offset from the geometric center thereof. The lens, lens blank, or mold for the lens has at least two focal regions defined by at least one ledge line, and the axis of spinning passes perpendicularly through the ledge line or an extension thereof. Structure is provided to apply a coating, and spinning is continued until the coating is sufficiently dry that it has adhered with little risk of deformation to the coating on the lens, lens blank, or lens mold upon removal or movement.

12 Claims, 6 Drawing Sheets

APPARATUS FOR SPIN COATING A MULTIFOCAL LENS

BACKGROUND OF THE INVENTION

This invention relates to an apparatus for applying thin layers of coating onto a lens, typically an ophthalmic multifocal lens of the type made of plastic or resin. More particularly, the invention relates to an apparatus for spin coating multifocal lenses of the type having ledge lines defining the boundary between two focal regions of the lens, while maintaining the optical and cosmetic qualities of the lens at the ledge line, after having applied the coating to the lens.

Present day technology requires that lenses be coated, for example, with an abrasion resistant hard coating, and optionally with coatings having anti-reflective properties. Multi-layer coatings are often applied to achieve one or both of the noted features, as well as numerous other characteristics which can be imparted to a lens by virtue of the coatings.

In the case of multifocal lenses, i.e., lenses having separate regions with differing focal characteristics such as what are conventionally known as "bifocal or multifocal, or straight-top or flat-top lenses," the lines defining the boundary between different focal regions of the lens, generally known as a ledge or vision-transition line, must be sharp and clear, and free of defects. Present technology employing molds for casting high-quality, multifocal lenses typically produce lenses of high quality with all of the noted properties. Thus, when coating such a lens, it is necessary to maintain the features achieved with the original lens manufacture after having coated the lens.

In the prior art, technology such as dip coating, spray coating, flow coating, and even spin coating has been employed to coat such lenses. All of the noted methods and apparatus produced a number of coating defects. In particular, most present-day coating methods and apparatus utilize coating solutions having a high percentage of solids. Such coatings are desirable to result in an improved coating having high abrasion resistant properties. Often such coating solutions result in thin coating layers of 2 microns to relatively thick coating layers of 8 microns in thickness.

While desirable for mono-focal and "no-line" progressive lenses having no ledge lines, such thick solutions create problems when employed on multifocal lenses having ledge lines because they fill in the ledge lines and damage and/or distort the precision of vision normally achieved with multifocal lenses. More particularly, a patient wearing such glasses with conventionally applied coatings may see a fuzzy line, interfering with clear vision. Generally such filling in of the ledge lines is known as a "line build-up," often resulting in the thus coated lens being discarded as being defective immediately after manufacture. In some extreme cases, the build-up is such that a drip is formed at one end of the ledge line, resulting in even greater defects.

As is well known, ophthalmic lens coatings are clear, just like the lens material upon which they are applied. Clear coating defects are easily detectable and harmful if the refractive index of the lens and the coating material are not of the same value. If a dark tint is also applied to the lens, which is a common practice for prescription sun glasses, any differences in coating thickness and excess coating build-up are further accentuated. Specifically, dyes used in the tinting process will penetrate a coating layer of different thicknesses at different rates, and will tint the substrate and/or the coating layer unevenly. This is especially noticeable at the ledge lines. Thus, not only are the resultant lenses rejected for optical defects such as providing a fuzzy or blurred vision at the ledge line, but tint defects as described above also contribute, to a significant degree, to the rejection of lenses as being defective.

A further problem with prior art dip-coating techniques is that dip coating is a relatively slow process requiring long draining cycles to remove the carrier solvent, and to dry and solidify the coating layer. As a result of the long times required, the semi-liquid coating can, as opposed to building up on the ledge lines, also pull away from the sharp edge of a ledge line. In such a case, the ledge line will not have been coated, and when tinted, will appear as a narrow, dark line.

Attempts to correct for the noted coating defects include the use of leveling agents, and maintaining of very tight process control parameters. Notwithstanding such attempts to control the prior art processes, since the largest force affecting such process defects is the force of gravity, which cannot be controlled, attempts to control the prior art processes often result in unsatisfactorily coated lenses. Also, there are a number of other causes of process defects which can only be moderately controlled, such as the surface energy of the substrate, the surface tension effects of the coating liquid, the coating chemistry, edge effects and capillary action type forces. It would therefore be desirable to provide a method which would help to control the application of coating liquid to a multifocal lens when one or more of these adverse influences are present.

SUMMARY OF THE INVENTION

In accordance with the invention the problems with the prior art coating techniques are eliminated in part by providing a spin-coating apparatus for applying coating to ophthalmic lenses, particularly, multifocal lenses with straight ledge lines. More specifically, the use of gravity in conventional dip coating is replaced by the use of centrifugal force in a specific application for manufacturing ophthalmic lenses.

In one aspect the invention is directed to an apparatus for coating a multifocal lens element, such as a lens, lens blank, or lens mold. The apparatus includes structure for spinning a lens element having a multifocal ledge line defining a boundary between at least two focal regions. The spinning is conducted about an axis substantially coincident with and substantially perpendicular to one of the ledge line and an imaginary line defining an extension of the ledge line. Further, the center of spin is at a location offset from the geometric center of the lens element. Thus, as the coating is flowed while the lens element is spun, this causes the coating to be distributed throughout the surface as a result of the spinning. The coating is applied to a surface of the lens element to be used as the outer surface of a finished multifocal lens to be formed therefrom.

In a more specific aspect, the coating is dispensed as a smooth, solid stream of liquid onto the lens element in a manner to impinge substantially over the entire surface of the lens element being coated. Further, the axis of spinning is selected to result in an eccentric movement of the lens element when spinning. The rate of spinning and coating are preferably selected to minimize differences in the thickness of the coating across the surface of the lens element.

In a yet more specific aspect, the surface of the lens element to be coated can face downward, although other orientations are possible, and the coating is dried while the lens element is spinning for an amount of time sufficient to have the coating physically attached to the lens element before terminating the spinning.

In another aspect of the invention, apparatus according to the invention is used to apply a coating to a multifocal lens mold surface. Lens forming materials are then placed into the mold to form the lens. The coating adheres more strongly to the lens materials than to the mold surface, such that a coated lens can be removed from the mold.

BRIEF DESCRIPTION OF THE DRAWINGS

Having thus briefly described the invention, the same will become better understood from the following detailed discussion thereof, taken in conjunction with the attached drawings, wherein.

DETAILED DISCUSSION OF THE INVENTION

Figure 1:
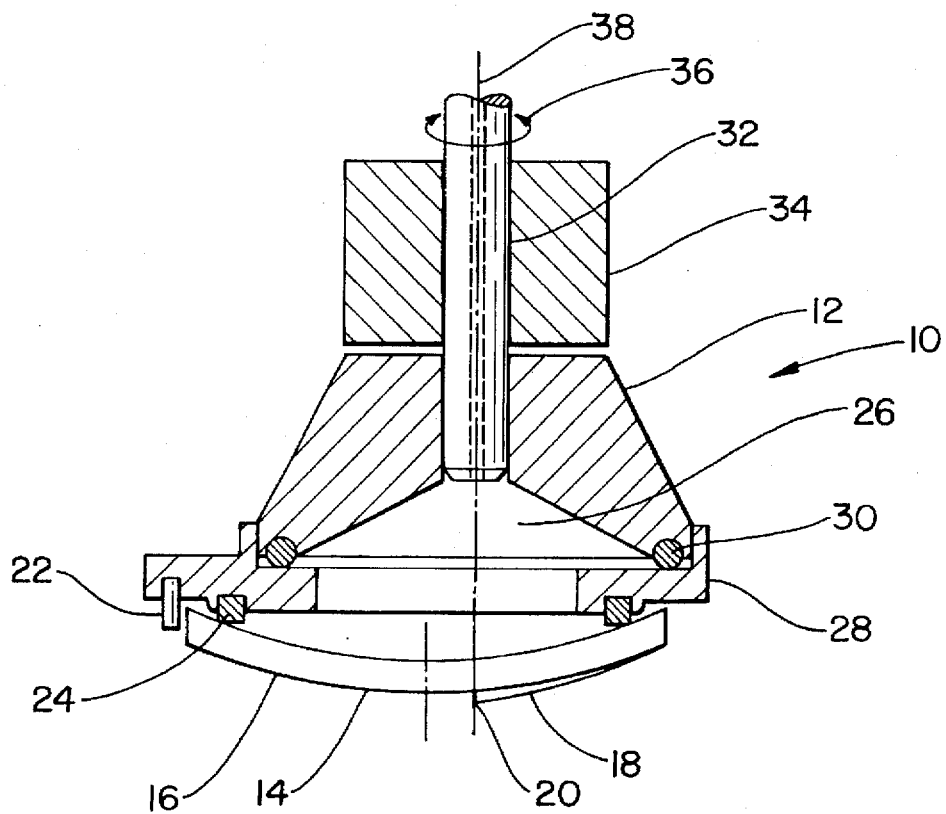
FIG. 1 is a side cross-sectional view of a lens blank holder for conducting spin coating of a lens blank.

In FIG. 1 there is illustrated a lens-blank holder 10 used in the apparatus of the invention. The lens-blank holder 10 is made up of a chuck 12 shaped to have a vacuum region 26 in which a vacuum can be generated for holding a multifocal lens blank 14 of a type having two focal regions. A first focal region 16 and a second focal region 18 which are defined relative to each other by what is known conventionally as a ledge line 20. It is noted that for purposes of this disclosure the term "lens blank" is intended to mean the original unit from which a lens is made. The lens blank can have the lens cut from it, or it can be the same as the lens only requiring final processing such as coating for use as a lens. The term "lens element" will refer to both a lens blank and a lens mold, all of which can be coated using the apparatus of the invention to produce a finished, coated multifocal lens. The invention will be primarily described with reference to the coating of a lens blank, although the coating of a lens mold will also be described.

Lens-blank locators 22 serve to relatively position the lens blank 14 with respect to the lens blank holder 10 and vacuum region 26, with seal 24, of conventional construction, serving to seal the surface of the lens blank 14 situated on the side of the vacuum region 26. This permits a vacuum to be drawn so that the lens blank 14 is held against the lens blank holder 10 through the vacuum drawn in a conventional manner through vacuum region 26. An adaptor 28 is employed with the chuck 12 to accommodate for different size lens blanks 14, and is held secured in sealed engagement against the chuck 12 by means of seal 30. A spindle 32 passes through a spindle bearing 34 and has its center aligned with the spin center of rotation 38 of the lens blank 14, with arrows 36 indicating that rotation can be clockwise or counter clockwise, or both, on a intermittent basis, as determined by the type of lens and the coating material to be employed to coat the lens blank.

Figure 2:
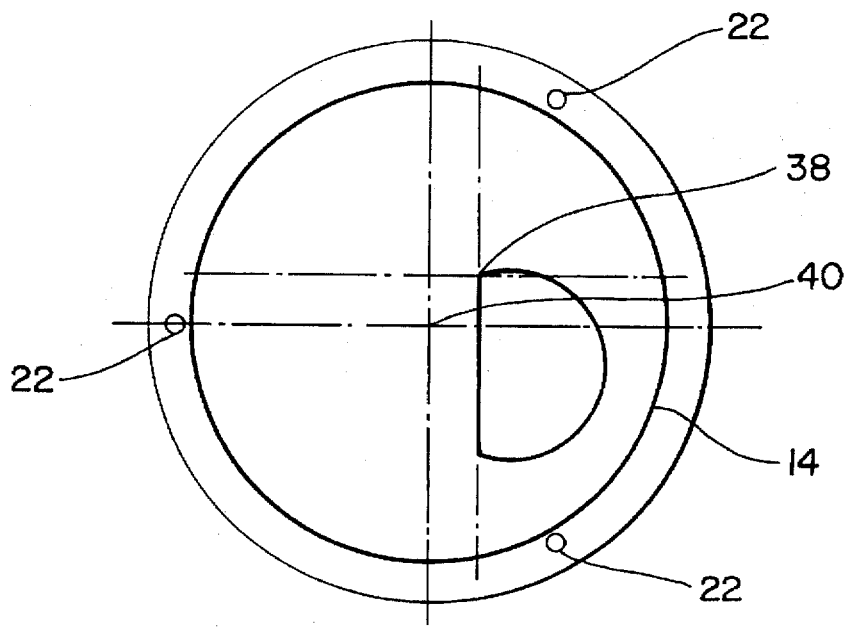
FIG. 2 is a top-plan view of a lens blank showing the surface to be coated, and experimentally illustrating the center of the lens blank as compared to the center of spin of the lens blank.
Figure 3:
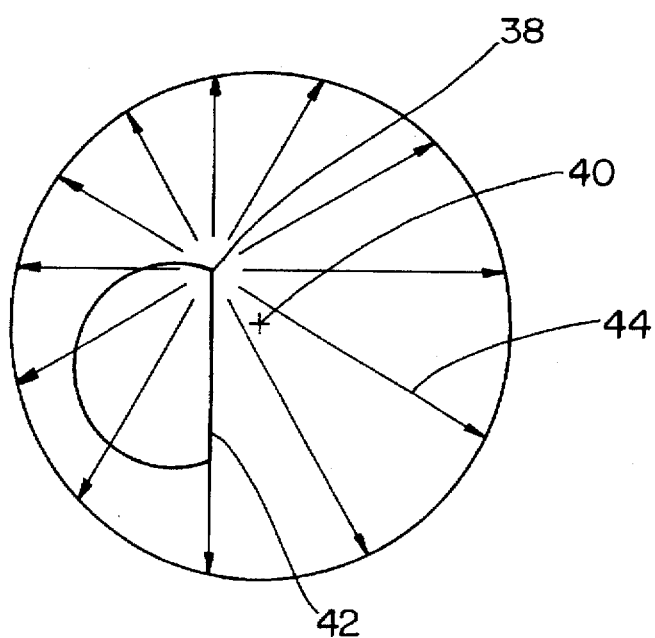
FIG. 3 is another top-plan view of a lens blank illustrating the radial flow of coating as the lens blank is spun about an axis coincident with a point on a ledge line for a multifocal lens.

A typical lens blank 14 on which the invention is practiced is illustrated in FIG. 2. As can be seen, the lens blank 14 includes a geometric center 40 and separately spaced different focal regions having a boundary between each other defined by a straight and a semi-circular ledge line. The geometric center of the lens is considered to be the center of the two-dimensional projection of the front or rear surface of the lens. The geometric center of a lens blank having a circular perimeter would be the center of the circle. A spin center 38 is located at the ledge line 20, i.e., the straight one closest to the center of the lens, but is offset from the geometric center 40 of the lens blank. Thus, as further illustrated in FIG. 3, if the lens is spun while a coating is being applied thereto, for example, in a solid stream form, as the lens blank is spun about spin center 38, the coating moves radially outward along radial spin-off lines 44, and including radial drain line 42, along the ledge line to substantially uniformly coat the lens blank 14. By the term "solid stream" is meant a stream of about 1 to about 5 millimeters in diameter, or alternatively, up to about 20 mm$^2$ in cross-section at any location thereof. The stream is substantially free of air bubbles or like inclusions, and can be produced by any nozzle configuration to result in a smooth flow of coating liquid. The coating should be applied at least partially at the point of rotation to insure that this area is covered, since flow of the coating will be away from the point of rotation because of the action of the centrifugal force.

Figure 4:
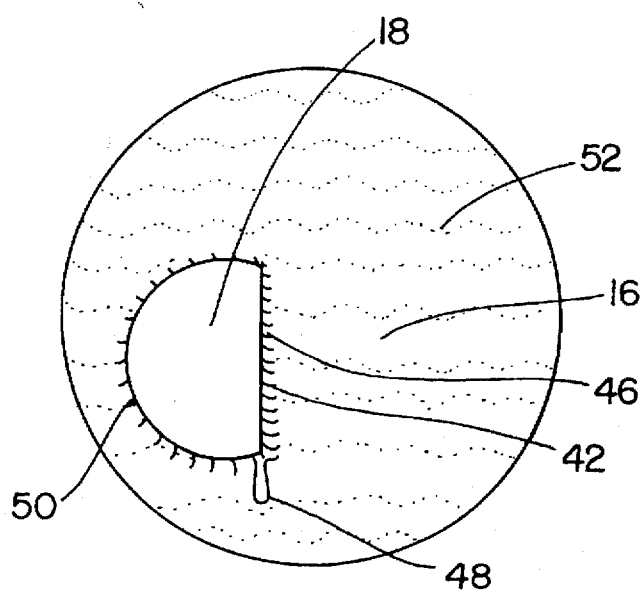
FIG. 4 is a top-plan view of a prior art dip-coated lens illustrating various defects resultant therefrom.

As compared to the prior art dip-coating techniques shown in FIG. 4, the spin technique in accordance with the apparatus of invention results in a more uniform coating. For example, as shown in FIG. 4, the prior art dip-coating technique in which gravity works downwardly results in build-up 50 of coating along the semi-circular ledge line of second focal region 18. A double line or build-up of coating 46 builds up along the straight ledge line 20 and 42 as well as a drop 48 which moves downwardly from the straight ledge line constituting a drain line 42. In addition, waves or sag lines 52 also result in additional defects from the prior art dip coating.

Figure 5:
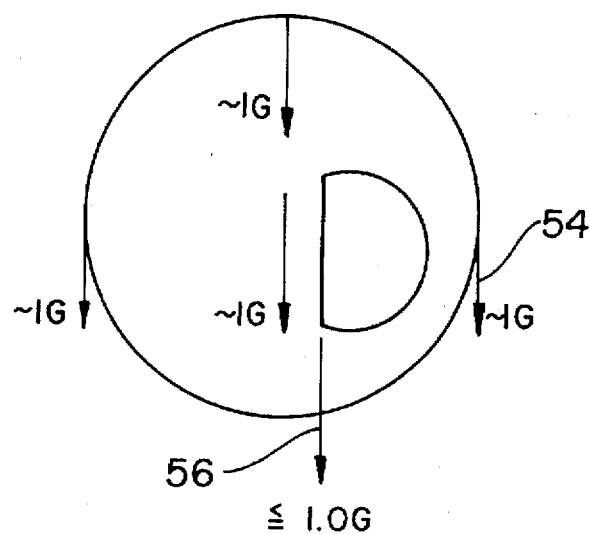
FIG. 5 is a top-plan view of a prior art dip-coated lens blank, as in FIG. 4, illustrating the various forces at work at different points on the lens blank, affecting the dip-coating material.

As can be further appreciated from the prior art dip coating illustration of FIG. 5, which is consistent with FIG.

Figure 6:
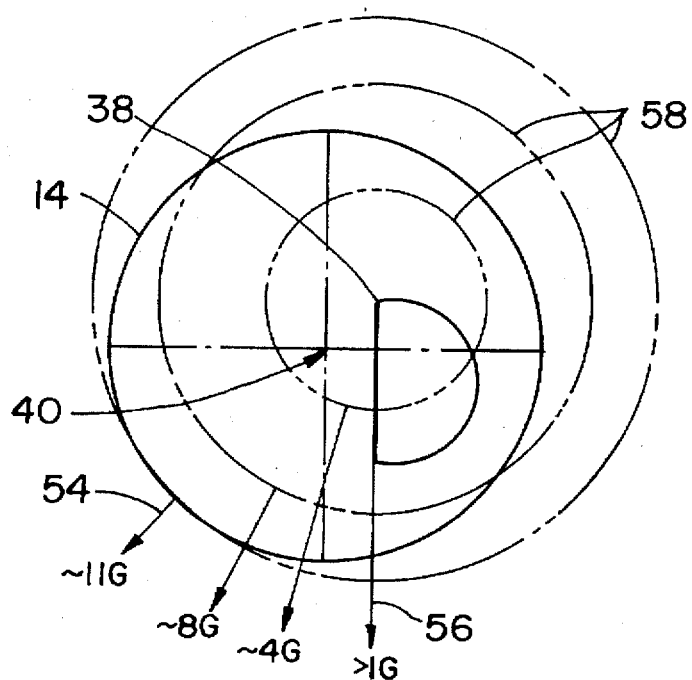
FIG. 6 is a view as in FIG. 5 of a lens blank coated by apparatus according to the invention, illustrating the various forces influencing the radial flow of the coating of the lens blank, depending upon its center of rotation.

4, the defects are primarily caused by the force of gravity as more generally illustrated by arrows 54 showing a downward force of gravity on the coating to be equal to approximately one gravity force, and at the drip-line region as illustrated by line 56, about equal to or less than the force of gravity. This is contrasted with FIG. 6 which shows the spin-coating process in accordance with the invention and the resultant forces acting on the coating at different locations as illustrated by lines 54 radiating from the center of spin 38. The forces acting upon the coating are more easily understood by the lines 58 of isometric gravity (G) force superimposed on the lens blank 14 which illustrate in greater detail the eccentric motion thereof and how centrifugal force on the coating will vary by location. In the case of the drip line off the straight ledge line, the force acting thereon is illustrated by arrow 56 which shows the force as being greater than about 1 gravity force, depending upon its relative position as the lens is spun around spin center 38.

Figure 7:
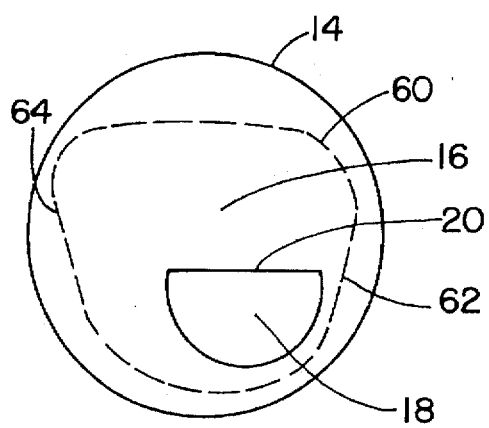
FIG. 7 is a top-plan view of a lens blank for a multifocal lens illustrating by dashed-line the shape of a lens to be cut therefrom.
Figure 8A:
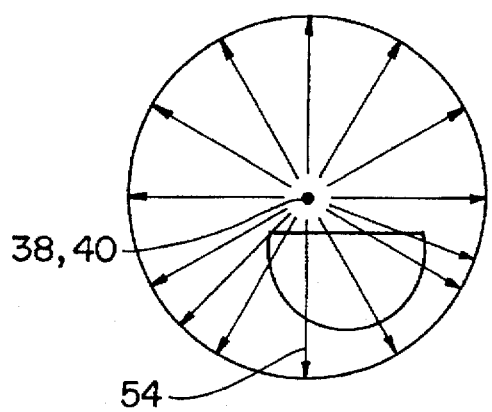
FIGS. 8a–8e are top-plan views of different lens blanks illustrating the radial flow of coating resulting from selection of different spin centers.
Figure 8B:
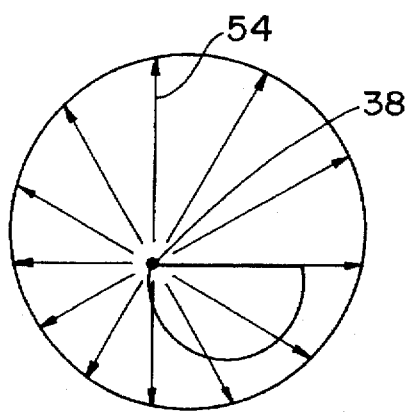
Figure 8C:
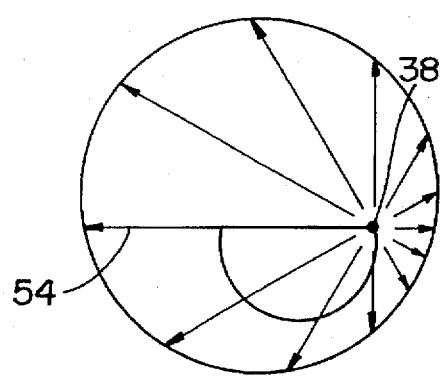
Figure 8D:
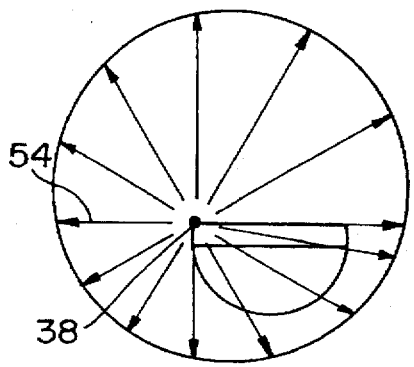
Figure 8E:
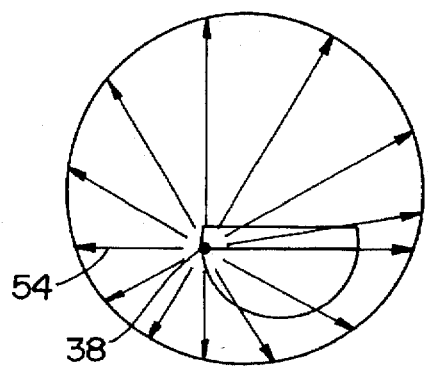

FIG. 7 illustrates a typical lens blank 14 for a right eye in accordance with the invention in which a lens to be cut therefrom is illustrated by dashed line 60. The dashed-line portion 62 illustrates the nasal side of the lens and the dashed line 64 illustrates the side opposite the nasal side, i.e., the temple side. As shown therein, the first focal region 16 is defined separate from the second focal region 18 by bifocal straight top ledge line 20 and its semi-circular counterpart bounding the bottom of the bifocal region.

As further shown in FIGS. 8a–8e, the forces acting upon the coating as illustrated by arrows 54, can be effected and varied in a manner apparent to those of ordinary skill in the art by simply varying the center of spin 38. For example, FIG. 8a places the center of spin 38 as being the same as the lens center 40. In FIGS. 8b–8e, the center of spin 38 is offset from the center 40 of the lens blank, resulting in different magnitude force lines 54, depending upon the location of the rotational center of the lens blank on which the coating is applied.

As may be appreciated, in using the apparatus of the invention, all lenses or lens blanks may be identified by conventional bar code techniques. The spin-coat process is controlled precisely, with spin direction, rotational speed (stepless motor operation), time cycles and any other process parameters programmed in a conventional manner into the spin-coat machine described hereafter with reference to FIG. 9.

Figure 9:
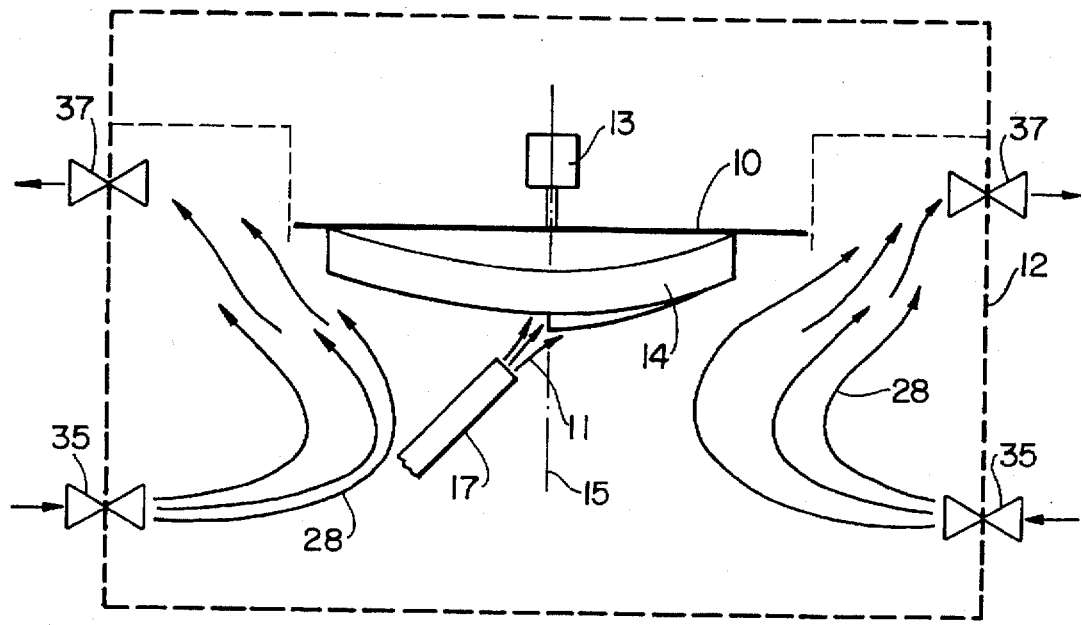
FIG. 9 is a schematic diagram illustrating the spin-coating apparatus.

FIG. 9 is a schematic diagram which illustrates the apparatus of the invention. A lens blank holder 10 is within a coating chamber 12, shown in phantom to indicate that the apparatus of the invention can be utilized with many spin coating device constuctions. The chemistry of the coating, the surface energy and configuration of the lens, and other parameters that are particular to the lens and coating could require adjustments or modifications to the spin coating device. An enclosure should be provided that will protect the lens as it is being coated from dust and other contaminants, and can otherwise be used to control the atmosphere surrounding the lens. The lens blank holder 10 can use any suitable means for retaining the lens, including vacuum, mechanical, adhesive, and the like. The lens blank holder 10 can be movable to a nonoperative upper position (not shown) wherein a lens blank 14 can be attached and/or removed. The lens blank holder 10 has attached thereto at the spindle, a spindle drive 13 to cause rotation of the lens blank about an axis of spin 15. Thus, when in an operative position, lens blank holder 10 is lowered and the lens blank 14 is introduced into the coating chamber 12. It is desirable that the coating chamber 12 seal tightly to prevent the escape of volatile portions of the coating solution, and also to prevent the introduction of contaminants into the coating as it is applied. Coating solution is injected into the chamber 12 through a coating solution inlet 17 to be applied uniformly throughout the surface of the lens blank 14 as illustrated by arrows 11. As the coating solution is applied, the lens blank 14 is rotated by means of spindle drive 13, and either simultaneous with the application of the coating solution, or shortly after commencement of introduction of the coating solution, temperature controlled drying air can be introduced through ventilation inflows and follows the path illustrated by the arrows 28 to dry the coating solution. Control of the drying air flow can be performed by inlet valves 35 and exit valves 37. The air can be continuously flowed even after coating solution is no longer being introduced, until such time as the coating solution is sufficiently dry so that it has adhered sufficiently to the surface of the lens blank 14 that it does not deform on the lens blank 14. The gas introduced through inlet valves 35 can be air or any other clean and dry gas processed sufficiently to not impinge contaminates on the surface of the coating.

The valves 35, 37 can be used to regulate the flow of temperature and humidity controlled drying gas, such as air or nitrogen. The valves can also be used to close and seal the coating chamber 12. The coating chamber can be filled with solvent vapor saturated gas and sealed off. This enriched, moist atmosphere inside the coating chamber controls premature drying of the coating film, and helps to avoid scaling, streaking, and unwanted build-up of the coating.

The coating solution inlet 17 and solution dispensing nozzle preferably point upward, or upward in a tilted configuration. The dispensing nozzle thereby will not drip during a period of inactivity of the inlet 17. Such drips can flaw a lens which has just been coated. Also, care should be taken to avoid bubbles and foam in the coating solution. Pumps must not cavitate, and filters and piping must be self purging. A reservoir to de-gas the coating solution, and upwardly oriented piping toward the dispensing point help to avoid bubbles and foam in the coating solution.

The coating liquid can be applied by structure other than a nozzle. Dipping, spraying and other structure for applying coatings can be utilized. The apparatus of the invention will distribute the coating liquid across the surface of the lens. Excess coating liquid will be thrown off from the ledge line by the rotation of the lens.

The spin direction, rotational speed (stepless motor operation) and application rate, time cycles and any other process parameters are varied for the particular coating composition that is to be applied and the particular surface/lens geometries. The temperature, velocity and volume of air is a significant factor in the resulting coating. The process parameters for a lower viscosity coating, such as an anti-reflective (AR) coating layer, are very different from the parameters that are necessary to apply a higher viscosity coating, such as an abrasion resistant hard-coat. These parameters are determined by experimental process design and then controlled by electronic programming. The coating process begins at the start of the spin cycle, or slightly before. It is possible to inject the vapor of a solvent for the coating into the coating chamber, or to utilize residual solvent vapor from a previous cycle, in the coating chamber prior to the introduction of the coating to facilitate the flow of coating onto the lens and to prevent premature drying. The spin rate is at least partially determined by the coating that is to be applied. Generally, faster speeds are necessary for more viscous coatings. A speed that is too fast will throw the coating off the lens blank surface without distributing the coating properly. A speed that is too slow will not generate enough force to cause the coating to flow properly. Coating spin speeds of between about 400–600 rpm are currently preferred. The coating time will also vary depending upon the coating that is used and the process characteristics, but generally will be between about 2–4 seconds. The flow of coating solution is then cut-off. The spin speed of the lens can also be increased, to between about 800–1200 rpm, to assist in drying the lens coating. Drying gas such as air or nitrogen is then preferably applied.

The drying air and spinning continues until the coating is in a semi-solid state and does not deform on removal of the lens blank from the spin process, which usually requires between about 4–13 seconds. The entire process, including coating and drying, preferably requires between about 8–15 seconds. Automated machinery can assist loading and unloading of each lens such that the entire cycle time for coating a lens, including loading and unloading, requires less than about 22 seconds.

Drying gas flowing in and out of the coating chamber can carry dust or droplets of coating liquid onto the tacky/fresh coated lens surface. This is undesirable, and a control of the gas sufficient to avoid this effect is desirable. The reversal of this flow can have major process impacts. A reversed flow from that shown, from the outside over the moist lens surface and through the chamber, on the other hand, can dry up the coating liquid prematurely, thus causing severe coating defects. Thus, it is important to properly control and direct the flows to avoid the noted problems while maintaining high process yields.

Preferably, the lens blank 14 is continuously spun until the coating film is dry, i.e., the solvent base of the applied coating solution is flashed off, so that the coating is in a semi-solid state and does not deform on removal from the influence of the centrifugal force. Coating chamber ventilation air aids in this drying process.

With respect to the location of the spin axis, it is noted that the preferred position of the spin center 38 is on or near or close to, i.e., within about ±7 millimeters, of a bifocal ledge line 20, or any extension of that ledge line, for example, as an imaginary line. Ideally the spin center 38 is aligned with the end of the ledge line which is positioned closest to the geometric center of the lens. This location for the spin center 38 is preferable whether the ledge line is straight or slightly curved, as in the "curved top" multifocal lenses known in the art. The invention will have utility where the ledge line is curved except where the curve is radical, such as in round or half-round multifocals. The orientation of the spin axis can be any with respect to the direction of gravity, including the orientation in which the convex surface of the lens is facing upward. Horizontal or other orientations of the spin axis between the horizontal and the vertical are also possible.

Although FIGS. 8a–8e have illustrated a number of different locations for a spin center, it is noted that it is preferred that the spin center, as noted previously, is near the multifocal ledge line closest to the geometric center of the lens. Thus, for example, the spin center of FIG. 8a should only be employed when an "ultra thin" coating layer is to be applied, i.e., less than 0.5 micron. As will be appreciated, the system of the invention is particularly useful when thick coating layers, i.e., greater than about 0.5 micron, are to be applied and provides improved results.

Figure 10:
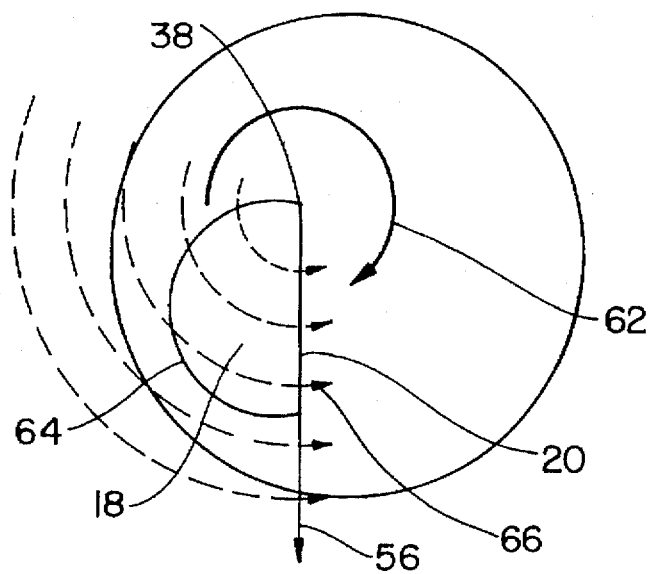
FIG. 10 is a top-plan view schematically illustrating the relationship between a rotating lens blank and the effects of ambient air or an air flow on the coating liquid/film.
Figure 11:
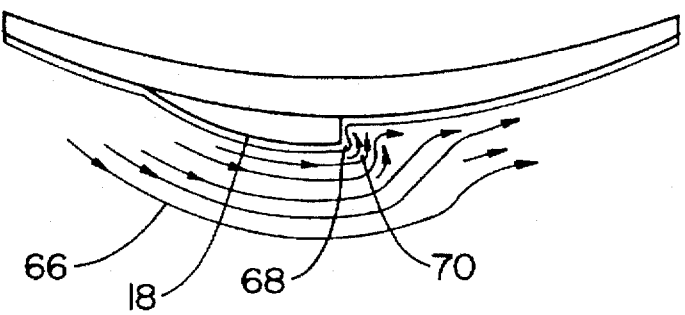
FIG. 11 is a side view illustrating the flow of coating liquid and its deposition along a ledge line (being effectively shaped as an acting air foil) when the blank of FIG. 10 is rotated in a clockwise direction.
Figure 12:
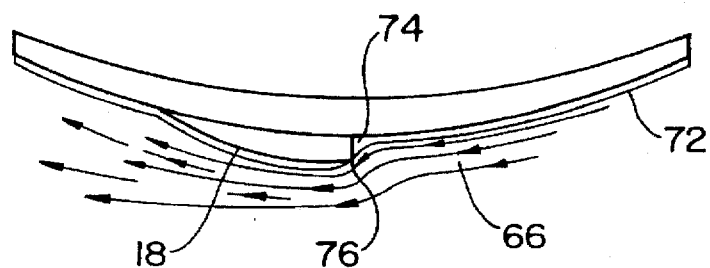
FIG. 12 is a view as in FIG. 11, but illustrating the effects on the liquid coating of the lens blank rotated in a counter clockwise direction.

FIG. 10 illustrates the relationship between the rotating lens blank and coating when an air flow is impinged upon it. In FIG. 10 the air flow is directed counter clockwise, as shown by arrows 66, when the blank rotation is clockwise 62. Thus the sloping, semicircular ledge line 64 serves as a leading edge and the straight ledge line 20 is the trailing edge. This results, as shown in FIG. 11, in a small meniscus coating 68 of material as a result of eddy currents 70 which is of an acceptable quality as it protects the top most edge of the ledge line 20. In contrast, when rotation of the lens blank is reversed, as shown in FIG. 12, there results a light build up of coating 74 at the straight ledge line 20, with too thin a coating a the outer most edge 76 of the straight ledge line as compared to a normal coating thickness 72.

It has been found that the angle between the spin axis and the stream of coating liquid and the direction of the stream of coating liquid relative to the direction of spin of the lens blank can make a significant difference in the flow of liquid over the surface and in minimizing splatter and air enclosures. An angle of the nozzle 17, and thus the coating liquid stream, relative to the spin axis 15 (FIG. 9), is preferably up to about 45° away from the spin axis 15. The angle is observed to assist the flow of coating liquid over the surface of the lens.

The direction of the stream of coating liquid should be the same as the direction of air flow shown in FIG. 10, that is, substantially opposite to the direction of rotation of the lens blank. The lens blank should be rotated in the direction such that the sloped, semicircular ledge line 64 of the lens blank is the leading edge and the staight ledge line 20 is the trailing edge. The coating liquid, when applied in a direction opposite the direction of rotation of the lens and with the sloped, semicircular ledge line 64 as the leading edge, will flow smoothly over the second focal region 18. The coating liquid will tend to splatter and not flow evenly over the second focal region 18 if the straight ledge line 20 is the leading edge, since the abrupt vertical wall of this ledge line will strike the coating liquid and cause irregular flow patterns similarly to the depiction for air flow shown in FIG. 12. The second focal region 18 on a right eye lens (FIG. 10) is located on an opposite side of the geometric center of the lens from that of a left eye lens (FIG. 2). Proper rotation of the lens to make the semicicular ledge line 64 the leading edge will require reversing the direction of rotation of the lens blank holder when changing from coating the right eye lens shown in FIG. 10 to the left eye lens shown in FIG. 2.

Figure 13:
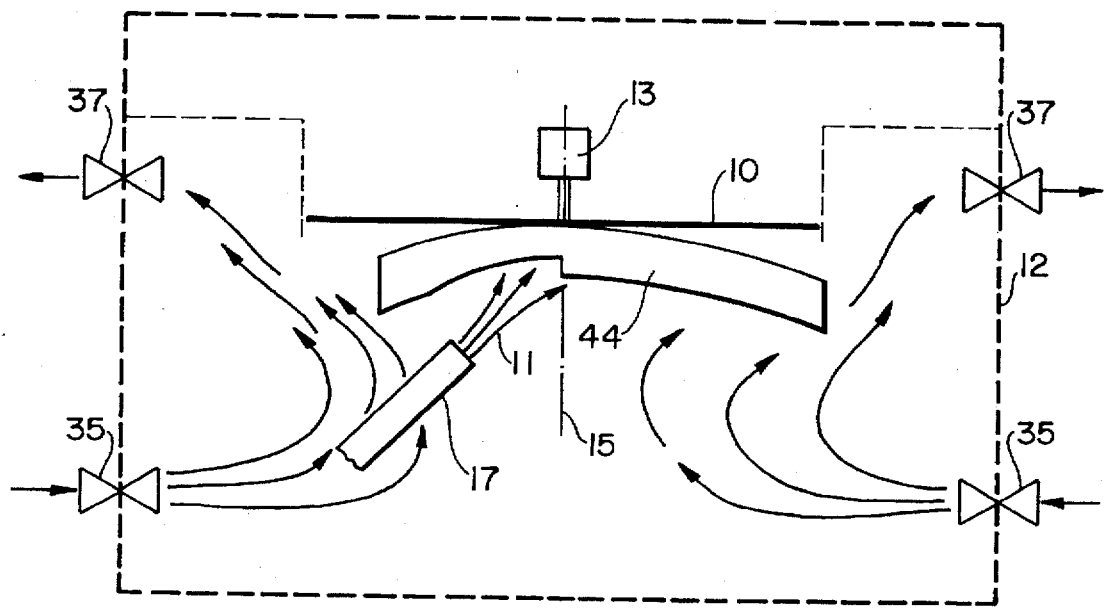
FIG. 13 is a schematic diagram illustrating the spin-coating apparatus of the invention as used to coat a lens mold.

The invention is also suitable for use with in-mold-coating processes. Such processes, as is known in the art, apply a lens coating, such as an abrasion resistant coating, first to the surface of the mold which will form the lens. The mold can be made of any suitable mold material, including metal, plastic or glass. The lens forming materials are then placed in the mold, and polymerization and solidification is initiated. The coating and the lens material bond or cross-link as polymerization advances. The coating is thereby transferred from the mold to the lens. The invention can be utilized to perform such processes by spinning the mold, rather than the lens blank, about a point that is determined from the mold surface which will form the ledge line, instead of the ledge line of the lens blank. All else would be performed substantially the same as when coating a lens. As with a lens, it will also be preferable to spin the mold in different directions depending on the contour of the mold. Almost any orientation of the mold surface with respect to the 'down' direction of gravity can be used, including horizontal, vertical, or any angular configuration in between. It was determined, however, that especially good results were obtained when the mold surface that was to be coated was facing down, and the coating was sprayed upward. The coating of a mold 44 is shown in FIG. 13. The apparatus is otherwise substantially the same as that described for FIG.

9, and like elements are therefore designated with like numerals. It may be necessary to adjust process parameters for the mold, however, since the mold presents only the reverse image of the lens and the surface to be treated will be different.

Having thus described the invention, the same will become better understood from the appended claims which are intended to define the invention in a non-limiting manner.

What is claimed is:

1. Apparatus for coating a multifocal lens element, comprising:

means for spinning a lens element for a multifocal lens having on a surface thereof a multifocal ledge line defining a boundary between at least two focal regions of the lens, with said spinning being conducted about an axis substantially coincident with and substantially perpendicular to one of said ledge line and an imaginary line defining an extension of said ledge line, and at a location offset from a geometric center of said lens element; and means for applying a liquid coating onto said surface of said lens element, so that when said lens element is spun said coating will be distributed throughout said surface as a result of said spinning.

2. The apparatus as in claim 1 wherein said means for applying said coating liquid applies said coating onto said lens element surface at an angle relative to said spin axis that is from 0 to about 45 degrees.

3. The apparatus as in claim 1 wherein said lens element is a lens blank having a first focal region and a second focal region, the second focal region having an abrupt, straight ledge line and a sloping ledge line, the structure for spinning reversing the direction of spin, whereby the direction of spinning of the lens blank can be selected such that the sloping ledge line is the leading edge, and the coating liquid is applied as a stream in a direction selected so as to cause the liquid coating to flow substantially from the sloping edge to the straight ledge.

4. The apparatus as in claim 1 wherein said lens element is a lens blank having a first focal region and a second focal region, the second focal region having an abrupt, straight ledge line and a sloping ledge line, and wherein said means for spinning spins the lens blank about an axis perpendicular to said ledge line at a location closest to the geometric center of said lens blank, but offset from said geometric center.

5. The apparatus as in claim 1, further comprising drying means for drying said coating an amount sufficient to adhere the coating to the lens.

6. The apparatus as in claim 1 wherein said means for applying said coating flows said coating after spinning has commenced.

7. The apparatus as in claim 1, wherein said means for applying said coating flows said coating substantially simultaneously with commencement of spinning.

8. Apparatus for affixing a coating solution to a spinning multifocal lens element, comprising means for spinning said lens, and means for applying said coating to said lens element from a position below said lens element as it is spinning, said coating being applied at least at the axis of rotation of said lens element, and means for drying said coating solution an amount sufficient to have said coating solution physically fixed to said lens element before ceasing the spinning of said lens element.

9. The apparatus as in claim 8 further comprising structure for holding said lens element such that the surface of said lens element to be coated is held facing downward.

10. The apparatus as in claim 8 wherein said means for applying said coating applies said coating onto said lens element surface at an angle relative to said axis of rotation that is from 0 to about 45 degrees.

11. Apparatus for affixing a coating solution to a spinning multifocal lens element, comprising means for spinning said lens, and means for applying said coating to said lens element as it is spinning, said coating being applied at least at the axis of rotation of said lens element, said axis of rotation being located to result in an eccentric movement of said lens element when spinning, and means for drying said coating solution in amounts sufficient to have said coating solution physically fixed to said lens element before ceasing the spinning of said lens element.

12. An apparatus for coating a lens, comprising:

means for spinning a lens in an enclosed chamber; and means for applying a coating to said lens, from a position below said lens, during said spinning;

said means for spinning comprising means for holding said lens in said chamber and for closing said chamber from the outside;

ventilating passages defining a flow path for ventilation for drying said lens at least after coating; and said means for applying a coating impinging said coating at the spin center of said lens.

* * * * *